United States Patent
Teratani et al.

(10) Patent No.: US 6,919,287 B2
(45) Date of Patent: Jul. 19, 2005

(54) ALUMINUM NITRIDE MATERIALS AND MEMBERS USED FOR THE PRODUCTION OF SEMICONDUCTORS

(75) Inventors: Naomi Teratani, Nagoya (JP); Jun Yoshikawa, Nagoya (JP); Yuji Katsuda, Stuttgart (DE)

(73) Assignee: NGK Insulators, Ltd., Nagoya (JP)

( * ) Notice: Subject to any disclaimer, the term of this patent is extended or adjusted under 35 U.S.C. 154(b) by 62 days.

(21) Appl. No.: 10/417,962

(22) Filed: Apr. 17, 2003

(65) Prior Publication Data

US 2003/0203804 A1 Oct. 30, 2003

(30) Foreign Application Priority Data

Apr. 22, 2002 (JP) .................................... P2002-119743
Oct. 30, 2002 (JP) .................................... P2002-315270

(51) Int. Cl.⁷ ...................... C04B 35/581; C04B 35/582
(52) U.S. Cl. .................. 501/98.4; 501/98.6; 252/518.1; 252/521.1
(58) Field of Search .............................. 501/98.4, 98.6; 252/518.1, 521.1

(56) References Cited

U.S. PATENT DOCUMENTS

| | | | |
|---|---|---|---|
| 4,659,611 A | 4/1987 | Iwase et al. ................ | 428/209 |
| 4,766,097 A | 8/1988 | Shinozaki et al. ......... | 501/98.4 |
| 5,705,450 A | 1/1998 | Chiao | |
| 5,998,321 A * | 12/1999 | Katsuda et al. ............ | 501/98.4 |
| 6,001,760 A | 12/1999 | Katsuda et al. ............ | 501/98.4 |
| 6,225,249 B1 * | 5/2001 | Fujita et al. ................ | 501/98.4 |
| 6,403,510 B1 | 6/2002 | Kuibira et al. ............. | 501/98.5 |
| 6,486,085 B1 * | 11/2002 | Katsuda et al. ............ | 501/98.4 |
| 6,607,836 B2 * | 8/2003 | Katsuda et al. ............ | 501/98.4 |
| 2002/0110709 A1 | 8/2002 | Katsuda et al. | |

FOREIGN PATENT DOCUMENTS

| | | |
|---|---|---|
| CN | 1221711 A | 7/1999 |
| EP | 1 078 902 A1 | 2/2001 |
| JP | 9-315867 | 12/1997 |
| JP | 10-154746 | 6/1998 |

OTHER PUBLICATIONS

U.S. Appl. No. 10/704,997, filed Nov, 10, 2003, Teratani et al.

* cited by examiner

Primary Examiner—Karl Group
(74) Attorney, Agent, or Firm—Burr & Brown

(57) ABSTRACT

An aluminum nitride material having a high thermal conductivity and reduced room temperature volume resistivity is provided. The aluminum nitride material has an interconnected intergranular phase that functions as an electrically conductive phase. The content of the conductive phase is not higher than 20 percent, calculated according to the following formula based on an X-ray diffraction profile: Content of the conductive phase (%)=(Integrated strength of the strongest peak of the conductive phase/Integrated strength of the strongest peak of aluminum nitride phase)×100. The aluminum nitride material has an electric current response index in a range of 0.9 to 1.1, defined according to the following formula: Electric current response index=(Electric current Aat 5 seconds after a voltage is applied/Electric current at 60 seconds after a voltage is applied).

24 Claims, 10 Drawing Sheets

(4 of 10 Drawing Sheet(s) Filed in Color)

ALUMINUM NITRIDE MATERIALS AND MEMBERS USED FOR THE PRODUCTION OF SEMICONDUCTORS

This application claims the benefits of Japanese Patent Applications P2002-315, 270, filed on Oct. 30, 2002 and P2002-119, 743, filed on Apr. 22, 2002, the entireties of which are incorporated by reference.

BACKGROUND OF THE INVENTION

1. Field of the Invention

The invention relates to an aluminum nitride material and a member for use in the production of semiconductors.

2. Related Art Statement

An electrostatic chuck system utilizing Johnson-Rahbek effect is useful for the adsorption and retention of semiconductor wafers. In such a system, the volume resistivity of the substrate of the chuck is preferably $10^8$ to $10^{13}$ Ω·cm for improved adsorption force and speed of response. It is therefore desirable to control the volume resistivity of the substrate to be within $10^8$ to $10^{13}$ Ω·cm in the temperature range intended for use in the development of an electrostatic chuck.

The following methods are known for reducing the volume resistivity of an aluminum nitride sintered body at about $10^{10}$ Ω·cm.

(1) The intergranular phase of the sintered body is made interconnected and electrically conductive so as to reduce the volume resistivity. For example, a large amount of titanium nitride is added to aluminum nitride raw material powder to generate an intergranular phase mainly consisting of titanium nitride. The intergranular phase is interconnected. The interconnected intergranular phase may function as a conductive path. Such a method is described in, for example, Japanese patent publication 10-154, 746.

(2) Oxygen is solid soluted in aluminum nitride particles to improve the conductivity. For example, the assignee filed Japanese patent publication 9-315, 867 and disclosed a method of adding a trace amount of yttrium oxide into aluminum nitride having a high purity to control the volume resistivity at room temperature to a value between $10^8$ to $10^{13}$ Ω·cm.

SUMMARY OF THE INVENTION

When the intergranular phase of the aluminum nitride material is made to be conductive and interconnected to reduce the volume resistivity as described above, it is necessary to increase the weight ratio of the conductive material to be higher than about 20 volume percent. If the ratio of the conductive phase is lower, the conductive phase is not interconnected and does not substantially contribute to the reduction of the volume resistivity.

When a large amount of the conductive material is added to aluminum nitride powder to reduce the volume resistivity, however, the characteristic properties of the aluminum nitride tend to be lost or deteriorated. Particularly, the thermal conductivity of the aluminum nitride material may be reduced so that the material is not suited to an application for a semiconductor producing system.

When oxygen is solid soluted into aluminum nitride particles constituting the aluminum nitride sintered body to improve the conductivity of the particles as described above, the change of the volume resistivity is large depending on time after a voltage is applied thereon. That is, the difference is larger between the initial volume resistivity directly after the application of a voltage and that after a specific time period after the application of a voltage. When a device such as an electrostatic chuck is made of such aluminum nitride sintered body, the adsorption force may be unstable.

Further, in the aluminum nitride sintered body described in Japanese patent publication 9-315, 867, it is possible to reduce the volume resistivity. It is proved, however, that such a sintered body exhibits a voltage non-linear resistance. That is, the change of leak current is large depending on the change of an applied voltage. Specifically, a non linear index "a" is proved to be high, provided that $I=kV^a$ where "V" represents a voltage applied on the sintered body, "I" represents a leakage current when a voltage of "V" is applied and "k" represents a constant. Such non-ohmic voltage-current behavior is not desirable for a member for use in a semiconductor producing system, such as a semiconductor susceptor embedding an electrostatic chuck electrode.

For example, in the case of a ceramic electrostatic chuck a dielectric layer is provided between the electrostatic chuck electrode and the surface. The thickness of the dielectric layer is not constant and has a some degree of deviation or change. The voltage applied between the electrode and surface is constant at the same time. The applied electric field (V/mm) is smaller in the region where the dielectric layer is thicker, and the field (V/mm) is larger in the region where the dielectric layer is thinner. The leakage current is changed to be non-ohmic for the change of the applied voltage, and the deviation of the leakage current on the surface becomes larger so that the adsorption force becomes unstable.

An object of the present invention is to provide an aluminum nitride material having a reasonably high thermal conductivity and a reduced volume resistivity at room temperature.

Another object of the present invention is to provide an aluminum nitride material having improved response (stability) for an applied voltage.

Still another object of the present invention is to provide an aluminum nitride material in which its non linearity of voltage-current property is reduced.

The present invention provides an aluminum nitride material having an interconnected intergranular phase functioning as an electrically conductive phase. The content of the conductive phase is not higher than 20 percent calculated according to the following formula based on an X-ray diffraction profile:

Content of the conductive phase=(Integrated strength of the strongest peak of the conductive phase/Integrated strength of the strongest peak of aluminum nitride phase)×100.

An aluminum nitride material having interconnected intergranular phase functioning as a conductive path is known. However, the known material has a higher content of the conductive phase so that the characteristic properties of the material (particularly thermal conductivity) tends to be reduced. The inventors have tried to generate an interconnected intergranular phase of an aluminum nitride material functioning as a conductive path and reduce the content of the conductive phase to a value that is not higher than 20 percent based on the above formula. It has been proved that the volume resistivity of the aluminum nitride material may thus be reduced in addition to the thermal conductivity being considerably improved. The present invention is based on the discovery.

The X-ray diffraction profile is measured according to the following conditions as described in Experimental section:

CuKα, 50 kV, 300 mA; 2θ=10 to 70°;

Rotating anode type X-ray diffraction system "RINT" supplied by "Rigaku Denki."

The strongest peak of the aluminum nitride phase corresponds with the (100) plane according to a JCPDS card No. 25-1133. However, the strongest peak (100) may be overlapped with the other crystalline peak or peaks. In this case, a reference peak is selected having the highest strength among peaks which do not overlap the other peak or peaks. The integrated strength of the strongest peak is then calculated according to the following procedure. The integrated strength is calculated based on profile fitting using a Pseudo-Voigt function.

For example, when (101) peak of AlN is applied as the reference peak, the following procedure is performed:

(1) The integrated strength of the reference peak (101) is calculated based on the measured X-ray diffraction profile of a sample of aluminum nitride;

(2) The ratio of strength of the strongest peak (100) to that of the reference peak (101) is calculated based on a JCPDS card; and (3) The strength of the strongest peak (100) is calculated based on the strength of the reference peak (101) in (1) and the ratio of the strengths in (2).

The integrated strength of the strongest peak of the conductive phase may be calculated based on an X-ray diffraction profile according to the above conditions.

When the strongest peak overlaps that of the other crystalline phase peak, the integrated strength is calculated according to the following procedure:

(1) A reference peak is selected having the highest strength among peaks which do not overlap the other peak or peaks, based on an X-ray diffraction profile measured for a sample of aluminum nitride, and the integrated strength of the reference peak is calculated;

(2) The ratio of strength of the strongest peak to that of the reference peak is calculated based on a JCPDS card; and (3) The strength of the strongest peak is calculated based on the strength of the reference peak of the conductive phase in (1) and the ratio of the strength of the reference peak and that of the strongest peak in (2).

When the conductive phase is composed of a plurality of crystalline phases, the crystalline phases have the corresponding strongest peaks, respectively. Each integrated strength corresponding with each crystalline phase is calculated according to the above procedure. The thus calculated integrated strengths are then summed up to obtain a total value. The total value is defined as the peak strength of the conductive phase.

The present invention further provides an aluminum nitride material having an interconnected intergranular phase functioning as conductive phase. The material has an electric current response index of not lower than 0.9 and not higher than 1.1 defined according to the following formula:

Electric current response index=(Electric current at 5 seconds after a voltage is applied/Electric current at 60 seconds after a voltage is applied).

Figure 1:
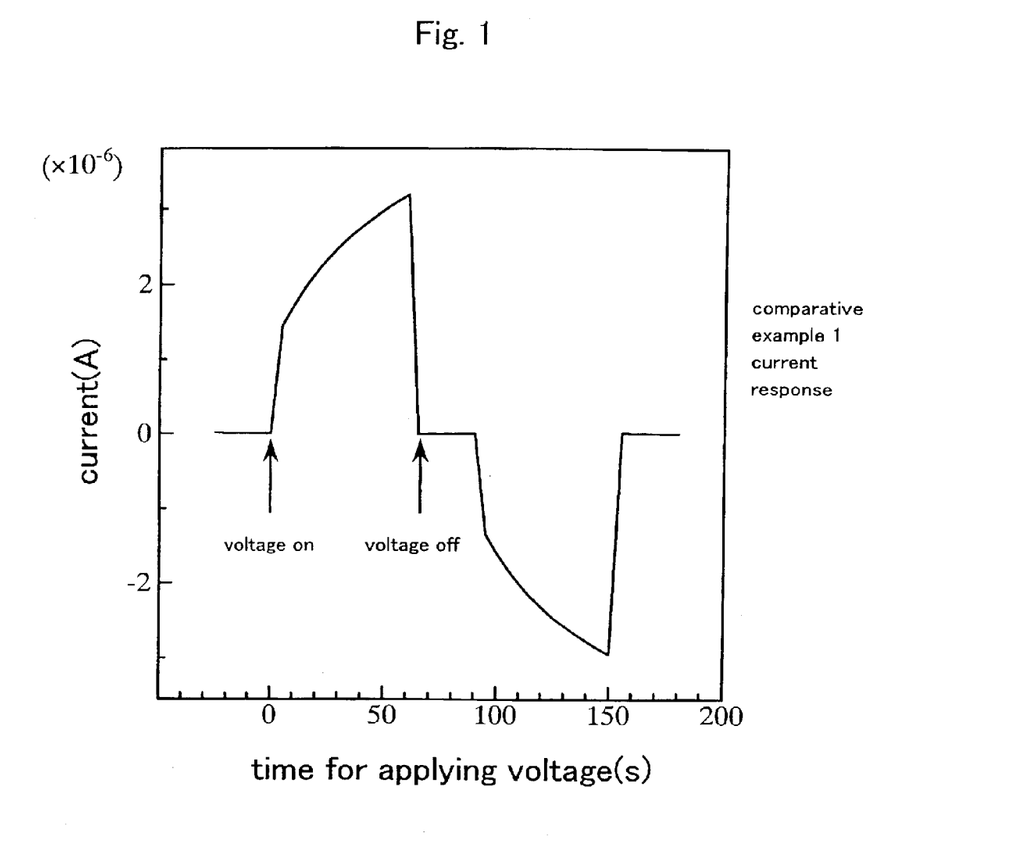
FIG. 1 is a graph showing the current response of a sample according to Comparative Example 1.

The aluminum nitride material has interconnected intergranular phases functioning as conductive phase or path, and has an electric current response index of not lower than 0.9 and not higher than 1.1. Such a material maintains the characteristic properties of an aluminum nitride material and further improves current response and stability, which are important for electronic parts. The current value direct after the application of a voltage tends to be low and unstable or changed after the application of a voltage, as shown in FIG. 1 in prior materials. For example, if the current value is changed in a material for an electrostatic chuck, its adsorption force becomes unstable and thermal transmission between the chuck and a wafer mounted thereon is also changed. The temperature distribution on the wafer thus becomes unstable. According to the present invention, the response and stability of the current value may be improved in an aluminum nitride material. Such material is suited for electronic parts.

The current response index is measured according to the procedure described in the Experimental section.

The present invention further provides an aluminum nitride material having an interconnected intergranular phase functioning as a conductive phase. The material has a non-linear index "a" of not higher than 1.5 in a range of an applied voltage "V" of 50 V/mm to 500 V/mm, provided that $I=kV^a$, where "I" represents a current value, and "k" represents a constant.

The aluminum nitride material of the present invention has a relatively linear change of the current value with respect to the applied voltage. Such an aluminum nitride material having a relatively ohmic voltage-current property is suitable for electronic parts. For example, in the case of an electrostatic chuck, when the material has non-linear voltage-current property, the two-dimensional distribution of adsorption force is increased. According to the aluminum nitride material of the present invention, such problems may be reduced or solved.

The presence of interconnected and intergranular phases may be confirmed by observing the microstructure of an aluminum nitride material by means of a scanning electron microscope, transmission electron microscope and EPMA. Whether the intergranular phase functions as a conductive phase or not may be confirmed by analyzing a current distribution analytic image obtained by an AFM (atomic force microscope). The region (conductive phase) where current is carried is brighter than the dark aluminum nitride particles surrounding the conductive phase. The presence of the conductive phase may thus be confirmed by the contrast of the brightness.

The present invention further provides a member used for the production of semiconductors having each of the aluminum nitride materials described above.

The assignee filed Japanese patent application 2001-267, 588A. In the application, an aluminum nitride sintered body having intergranular phase mainly consisting of $SmAl_{11}O_{18}$ functioning as conductive phase is described. However, the content of the conductive phase described above, current response index and the linearity of voltage-current is not described.

The effects, features and advantages of the present invention will be appreciated upon reading the following description of the invention taken in conjunction with the attached drawings, with the understanding that some modifications, variations and changes of the same could be made by the skilled person in the art.

BRIEF DESCRIPTION OF THE DRAWINGS

The patent or application file contains at least one drawing executed in color. Copies of this patent or patent application publication with color drawing(s) will be provided by the Office upon re quest and payment of the necessary fee.

DETAILED DESCRIPTION OF THE INVENTION

In a preferred embodiment, the aluminum nitride material has a volume resistivity at room temperature of not higher than $10^{12}$ Ω·cm at an applied voltage of 500 V/mm. The lower limit of the room temperature volume resistivity of the material is not particularly defined. The volume resistivity may be not lower than $1 \times 10^7$ Ω·cm in many cases.

In a preferred embodiment, the conductive phase has a network-like microstructure. This term is defined as follows. That is, the conductive phase is formed along the interfaces (intergranular phase) between aluminum nitride grains. At least a part of the conductive phase is continuously formed or interconnected in the aluminum nitride material. Such a network microstructure may be confirmed by EPMA.

In a preferred embodiment, the conductive phase contains a $SmAl_{11}O_{18}$ phase as the main component. The conductive phase may further contain another samarium-aluminum oxide phase, such as a $SmAlO_3$ phase. The phases may be identified by means of an X-ray diffraction system using the conditions described in "Examples" section referring to a phase diagram When the main component of the conductive phase is a $SmAl_{11}O_{18}$ phase, the content of the conductive phase may be calculated according to the above formula. The content may be calculated as follows.

Figure 10:
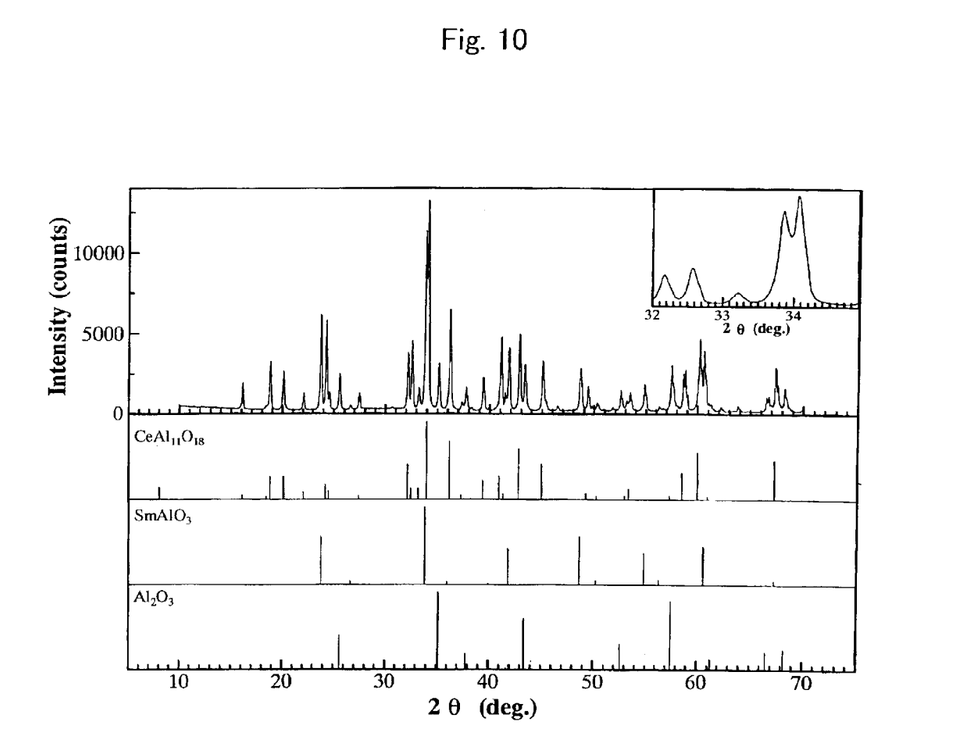
FIG. 10 shows an X-ray peak profile of $SmAl_{11}O_{18}$.

(1) Although the presence of the $SmAl_{11}O_{18}$ phase is confirmed in a phase diagram, the corresponding JCPDS card is not formed. $SmAl_{11}O_{18}$ is produced from $Sm_2O_3$ and $Al_2O_3$, and the peak profile is measured using an X-ray diffraction system. FIG. 10 shows the X-ray peak profile of $SmAl_{11}O_{18}$. The profile shown in FIG. 10 also includes the peaks corresponding to the $SmAlO_3$ phase and those corresponding to the $Al_2O_3$ phase. These unnecessary peaks are removed from the peak profile of FIG. 10 to obtain a group of peaks substantially identical with those of $CeAl_{11}O_{18}$. The crystalline phase is thus identified as a $SmAl_{11}O_{18}$ phase. Further, the position of the strongest peak of $CeAl_{11}O_{18}$ phase is 34.034° (JCPDS card No. 48-0055). The position of the strongest peak of the $SmAl_{11}O_{18}$ phase proved to be 34.06°. Such a small difference in the positions of the strongest peaks might be due to the difference in Ce and Sm atoms, although the cause is not clearly understood.

Further, the difference of the position of the strongest peak (2θ=33.86°) and that of $SmAl_{11}O_{18}$ phase is very small. FIG. 10 shows an enlarged view of a part of the peak profile near the position of 34°. As can be seen from the enlarged view, the strongest peaks of $SmAlO_3$ and $SmAl_{11}O_{18}$ phases may be clearly distinguished.

The integrated strength of the strongest peak (2θ=34.06°) of the $SmAl_{11}O_{18}$ phase and that of the reference peak (2θ=18.8°) are calculated to obtain a ratio of the integrated strengths of the strongest and reference peaks.

(2) The integrated strength of the reference peak (2θ=18.8°) of the conductive phase is measured for an aluminum nitride material.

(3) The integrated strength of the strongest peak of the $SmAl_{11}O_{18}$ phase in the material is calculated, based on the ratio obtained in (1) and the strength of the reference peak in (2). The strongest peak of the $SmAl_{11}O_{18}$ phase corresponds with the strongest peak (2θ=34.06°) of $SmAl_{11}O_{18}$ in (1).

In a preferred embodiment, the content of the conductive phase is not higher than 10 percent, calculated according to the following formula, based on an X-ray diffraction profile:

Content of conductive phase (%)=[I($SmAl_{11}O_{18}$, 2θ=18.8°)/I(AlN, (101))]×100.

When the main component of the conductive phase is the $SmAl_{11}O_{18}$ phase, the content of the conductive phase is preferably calculated according to the above formula. Specifically, the following procedure may be applied.

(1) The peak profile of an aluminum nitride material is measured by means of an X-ray diffraction system. The strength of the reference peak of $SmAl_{11}O_{18}$ (2θ=18.8°) is calculated based on the measured X-ray diffraction profile.

(2) The strength of the reference peak (101) of the aluminum nitride phase is measured.

(3) The ratio of the strength of the reference peak (2θ=18.8°) obtained in (1) and that of the reference peak (101) obtained in (2) is calculated.

In a preferred embodiment, the aluminum nitride material of the present invention contains samarium. In this case, the content of samarium is preferably not lower than 0.1 weight percent, and more preferably, not lower than 1 weight percent.

When the content of samarium is too high, the high thermal conductivity of aluminum nitride may be reduced or lost. From this viewpoint, the content of samarium is preferably not higher than 20 weight percent, and more preferably, not higher than 10 weight percent.

The thermal conductivity of the aluminum nitride material of the present invention is preferably not lower than 70 W/mK, and more preferably, not lower than 80 W/mK.

In a preferred embodiment, the conductive phase contains ytterbium. In this case, the non-linear index in the relationship of an applied voltage "V" and current "I" proved to be further improved.

In this embodiment, the weight ratio of the content of ytterbium to that of samarium in the material (Yb/Sm) is preferably not lower than 0.05, and more preferably, not lower than 0.1.

Further, the ratio (Yb/Sm; weight ratio) is preferably not higher than 1 to help the formation of the $SmAl_{11}O_{18}$ phase in a more stable manner.

Further, a rare earth element other than samarium and ytterbium may also be contained in the aluminum nitride material. The ratio of the content (weight) of the additional rare earth element to that of samarium is preferably not higher than 1.

The mean particle diameter of aluminum nitride particles in the material is preferably not smaller than 1 μm and not larger than 20 μm. The mean particle diameter is preferably not larger than 8 μm, for improving the strength.

The relative density of the aluminum nitride material is preferably not lower than 95%.

It is possible to give a color of a low lightness (blackish color) to the surface of the aluminum nitride material by adding one or more transition metal element selected from the group consisting of metal elements belonging to the following Groups on the periodic table: IVA, VA, VIA, VIIA and VIIIA.

The transition metal is preferably Ti, Zr, Hf, V, Nb, Ta, Cr, Mo, W, Mn, Fe, Co or Ni, and most preferably, Ti, Mo or W.

The nitride of the transition metal is preferably present in the material with a low lightness. In this case, it is preferred that the nitride is present mainly in the intergranular phase or layer between aluminum nitride grains.

Although the aluminum nitride material of the present invention is preferably obtained by sintering, the material may be obtained by a gaseous phase process, such as chemical vapor deposition, physical vapor deposition, vapor deposition and sputtering.

The aluminum nitride raw material may be produced by various processes, including direct reduction, reduction nitriding and gaseous phase synthesis from an alkyl aluminum.

When sintering is applied, samarium oxide may be added to the aluminum nitride raw material powder. Alternatively, a compound forming samarium oxide upon heating (a precursor of samarium oxide) may be added to the aluminum nitride raw material. The precursor includes samarium nitrate, samarium sulfate and samarium oxalate. The precursor may be added as powder. Alternatively, a compound such as samarium nitrate or samarium sulfate may be dissolved into a solvent to obtain a solution, which is then added to the raw material.

The raw material may be shaped by any known methods including dry press, doctor blade, extrusion, casting and tape forming methods.

When an additional rare earth element, other than samarium such as ytterbium, is added to the raw material of aluminum nitride, the oxide of the rare earth element may be used. Alternatively, the compound of the rare earth element, including the nitrate, sulfate and alkoxide, may be dissolved into a solvent which may dissolve the compound. The thus obtained solution may be added to the raw material.

When the transition metal element is added to raw material of aluminum nitride powder, the metal may be added. Alternatively, a metal compound such as a metal oxide, nitride, carbide, sulfate, nitrate or an organic metal compound may be added. Such metal compound may be a compound forming the metal oxide upon heating (precursor of the metal oxide). The metal, oxide or precursor may be added as powder. Alternatively, the precursor may be dissolved into a solvent to obtain solution, which is then added to the raw material.

In a mixing step, it is possible to simply agitate the formulation. When the raw powder contains aggregates, it is possible to use a mixing and grinding machine, such as a pot mill, trommel and attrition mill, for grinding the aggregates. When using an additive soluble in a solvent for grinding, the mixing and grinding step can be performed for a short (minimum) time to grind the particles. Further, a binder component, such as polyvinyl alcohol, may be added.

The solvent used for the mixing step may be dried, preferably by a spray dry method. After carrying out vacuum drying process, the particle distribution of the dried particles is preferably adjusted by passing the particles through a mesh.

In a step of shaping the powdery material, the material may be pressed using a mold to provide a disk-shaped body. The pressure for pressing raw material is not particularly limited, as long as the shaped body may be handled without causing any fracture. The pressure is preferably not lower than 100 kgf/cm$^2$. The powdery material may be supplied into a die for hot pressing without particularly shaping the powdery material.

The sintered body according to the invention is preferably produced by sintering at ambient pressure or hot pressing, preferably at a pressure of not lower than 20 kgf/cm$^2$.

The material according to the invention is preferably used for various members in a semiconductor producing system, such as systems for treating silicon wafers and for manufacturing liquid crystal displays.

The term member used for the production of a semiconductor means a member usable in any one of the steps of semiconductor processing. Such steps include exposure, film forming, etching, cleaning and semiconductor testing steps.

The member for producing semiconductors according to the present invention is preferably an anti-corrosion member, such as a susceptor for a system for producing semiconductors. The inventive member is also suitable for an article having the above anti-corrosion member and a metal member embedded within the anti-corrosion member. Such an anti-corrosion member includes a susceptor, a ring and a dome set in a system for producing semiconductors. A resistance heating element, an electrode for an electrostatic chuck and an electrode for generating high-frequency wave may be embedded within the susceptor.

The material according to the invention has a current response index close to 1.00 and the excellent voltage-current property as described above, and therefore is suitable as a substrate of an electrostatic chuck. An electrostatic chuck electrode is embedded within the substrate of the chuck. It is possible to further embed a resistance heating element, an electrode for generating plasma or the like within the substrate.

EXAMPLES (1) Production of Mixed Powder

Each of the powdery raw materials shown in Tables 1 and 3 were mixed in the ratios shown in each of the Examples in Tables 1 and 3.

AlN powder produced by reduction nitriding (with an oxygen content of 0.9 weight percent) was used. Commercial samarium oxide powder with a purity of not lower than 99.9 percent and a mean particle diameter of 1.1 μm was used. Commercial yttrium oxide powder with a purity of not lower than 99.9 percent and a mean particle diameter of not larger than 1 μm was used. Commercial cerium oxide powder with a purity of not lower than 99.9 percent and a mean particle diameter of not larger than 1 μm was used. Commercial ytterbium oxide powder with a purity of not lower than 99.9 percent and a mean particle diameter of not larger than 1 μm was used. Commercial titanium oxide powder with a purity of 98 percent and a mean particle diameter of 0.15 μm was used.

Each powder was weighed as shown in Tables 1 and 3. The weighed powders were then subjected to wet blending using isopropyl alcohol as a solvent in a nylon pot and using nylon media for 4 hours to obtain slurry. After the blending, the slurry was collected and dried at 110° C. The thus dried powder was then subjected to heat treatment in an atmosphere at 450° C. for 5 hours to remove the carbon content contamination that occurred during the wet blending to produce raw mixed powder. The compositions shown in Tables 1 and 3 were calculated ignoring the content of impurities.

(2) Shaping and Sintering Steps

Each mixed powder obtained in (1) was then shaped by means of uniaxial pressing at a pressure of 200 kgf/cm$^2$ to obtain a disk-shaped body with a diameter of 50 mm or 100 mm and a thickness of 20 mm, which was then contained within a mold made of graphite for sintering.

Each shaped body was sintered by hot pressing at a pressure of 200 kgf/cm$^2$ at the temperatures shown in Tables 1 and 3 for 4 hours and then cooled. During the sintering, the shaped body was set in a vacuum from room temperature to 1000° C., and then nitrogen gas was introduced at a pressure of 1.5 kgf/cm$^2$ from 1000° C. to each of the maximum sintering temperatures shown in the Tables.

(3) Evaluation

The thus obtained sintered bodies were processed and then subjected to the following evaluation.

The Sm content is determined by ICP (Induction Coupling Plasma) spectrometry. The Yb content is determined by ICP spectrometry. The Ti content is determined by ICP spectrometry. The oxygen content is determined by inert gas melting infrared absorptiometry analysis method.

To identify the conductive phase, the current distribution analytic images of samples were observed using an atomic force microscope (AFM). Each test sample had a shape of a plate with dimensions of about 2 mm×3 mm×0.2 mm (thickness). The face of the sample for current distribution analysis was polished. The analysis was carried out using a model "SPM stage D 3100" (probe type "DDESP") supplied by Digital Instruments. The measurement was performed on contact AFM current measurement mode. A direct current (DC) bias was applied on the lower face of the sample and the current distribution on the polished face was measured using the probe.

The density and open porosity are measured by Archimedes method using water as a medium.

The room temperature volume resistivity is measured by a method according to "JIS C 2141" under vacuum. The test sample has the following parts: a plate with φ 50 mm×1 mm; a main electrode with a diameter of 20 mm; a guard electrode with an inner diameter of 30 mm and outer diameter of 40 mm; and an applying electrode with a diameter of 45 mm. The electrodes are formed of silver. The applied voltage may be changed within a range of 50 V/mm to 1000 V/mm. A current is read one minute after the application of voltage so that the volume resistivity is calculated. In the columns in Tables 1 and 3, the volume resistivity at an applied voltage of 500 V/mm is described. The value "5.2×10$^9$" is represented as "5.2E"09." The same method of representation was applied in the Tables.

Thermal conductivity is measured by laser flash method.

The X-ray diffraction profile is determined by using a rotating anode type X-ray diffraction system "RINT" supplied by "Rigaku Denki" under the following condition: CuKα, 50 kV, 300 mA, and 2 θ=10 to 70°.

The microstructure was observed and the distribution of each element was analyzed by EPMA.

The same circuit used for the volume resistivity measurement was fabricated to provide a test sample to determine the current response index. A voltage of 500 V/mm was applied on the test sample to measure each of the current values at times of 5 and 60 seconds after the application of voltage. The current response index was calculated according to the following formula:

(current response index)=current value 5 seconds after the application of voltage/current value 30 seconds after the application of voltage.

The same circuit used for the volume resistivity measurement was fabricated to provide a test sample to measure (a). Each current value of the sample was measured for each applied voltage of 50, 100, 200, 300 or 500 V/mm. Each current value was measured about 60 seconds after the application of voltage. The applied voltage and current values are plotted. The relationship of the current "I" and voltage "V" are fitted to a function of I=kV$^a$ based on the minimun square method to calculate the parameters "a" and "k."

TABLE 1

| | composition (weight %) | sintering temperature (° C.) | content of Sm wt % | content of Yb wt % | content of Ti wt % | content of O wt % | conductive phase | open porosity % | bulk density g/cm3 | volume resistivity Ω · cm | thermal conductivity W/mK | average diameter μm | four point bending strength MPa |
|---|---|---|---|---|---|---|---|---|---|---|---|---|---|
| comparative example 1 | AlN/Y2O3 = 100/0.3 | 2000 | — | — | — | — | AlN | 0.04 | 3.26 | 4.1E+09 | 97 | 10 | 316 |
| comparative example 2 | AlN/CeO2 = 100/0.4 | 2000 | — | — | — | — | AlN | 0.04 | 3.27 | 6.9E+09 | 90 | 9 | 280 |
| example 1 | AlN/Sm2O3/TiO2 = 100/1/0.75 | 1850 | 0.57 | — | 0.55 | 1.32 | SmAl11O18 | 0.02 | 3.29 | 1.7E+10 | 87 | 4 | 401 |
| example 2 | AlN/Sm2O3/Al2O3/TiO2 = 100/2/1/2 | 1900 | 1.16 | — | 1.07 | 1.78 | SmAl11O18 | 0.01 | 3.32 | 1.6E+09 | 77 | 5 | 406 |
| example 3 | AlN/Sm2O3/Al2O3/Yb2O3/TiO2 = 100/3/1.1/1.5/1 | 1825 | 2.13 | 1.11 | 0.58 | 1.95 | SmAl11O18 | 0.02 | 3.41 | 1.3E+10 | 109 | 3 | 386 |
| example 4 | AlN/Sm2O3/Al2O3/Yb2O3/TiO2 = 100/3/1.1/1.5/0.5 | 1825 | 2.15 | 1.16 | 0.27 | 1.83 | SmAl11O18 | 0.01 | 3.35 | 3.5E+10 | 112 | 3 | 411 |
| example 5 | AlN/Sm2O3/Al2O3/Yb2O3/TiO2 = 100/5/3/0.6/1 | 1800 | 3.36 | 0.43 | 0.56 | 2.57 | SmAl11O18 | 0.03 | 3.39 | 5.7E+09 | 93 | 3 | 503 |

TABLE 2

| | XRD | | | | | | | |
|---|---|---|---|---|---|---|---|---|
| | conductive phase | | AlN | | conductive phase/AlN (%) | | | |
| | | | | | SmAl11O18 | SmAl11O18 | | |
| | SmAl11O18 ($2\theta = 18.8°$) | SmAl11O18 (strongest peak) | AlN (101) | AlN (100) | ($2\theta = 18.8°$)/ AlN (101) | (strongest peak)/ AlN (100) | current response | a |
| comparative example 1 | — | — | — | — | — | — | 0.77 | 3.19 |
| comparative example 2 | — | — | — | — | — | — | 0.72 | 1.28 |
| example 1 | 52 | 193 | 10727 | 13409 | 0.5 | 1.4 | 1.00 | 1.88 |
| example 2 | 98 | 364 | 6806 | 8508 | 1.4 | 4.3 | 1.00 | 1.60 |
| example 3 | 75 | 278 | 6968 | 8710 | 1.1 | 3.2 | 1.03 | 1.49 |
| example 4 | 55 | 203 | 7910 | 9888 | 0.7 | 2.0 | 1.04 | 1.50 |
| example 5 | 73 | 270 | 3905 | 4881 | 1.9 | 5.5 | 1.00 | 1.47 |

TABLE 3

| | composition (weight %) | sintering temperature °C. | content of Sm wt % | content of Yb wt % | content of Ti wt % | content of O wt % | conductive phase | open porosity % | bulk density g/cm3 | volume resistivity $\Omega \cdot cm$ | thermal conductivity W/mK | average diameter μm | four point bending strength MPa |
|---|---|---|---|---|---|---|---|---|---|---|---|---|---|
| example 6 | AlN/Sm2O3/ Al2O3/Yb2O3/ TiO2 = 100/5/3/1.4/1 | 1800 | 3.4 | 0.98 | 0.56 | 2.6 | SmAl11O18 | 0.04 | 3.39 | 3.4E+09 | 99 | 3 | 517 |
| example 7 | AlN/Sm2O3/ Al2O3/Yb2O3/ TiO2 = 100/5/3/2.4/1 | 1800 | 3.34 | 1.67 | 0.55 | 2.78 | SmAl11O18 | 0.03 | 3.40 | 5.4E+09 | 104 | 3 | 430 |
| example 8 | AlN/Sm2O3/ Al2O3/Yb2O3/ TiO2 = 100/5/3/3.8/1 | 1825 | 3.15 | 2.46 | 0.55 | 2.87 | SmAl11O18 | 0.02 | 3.35 | 1.3E+10 | 103 | 3 | 411 |
| example 9 | AlN/Sm2O3/ Al2O3/Yb2O3/ TiO2 = 100/5/3/2.4/3 | 1800 | 3.3 | 1.64 | 1.59 | 3.46 | SmAl11O18 | 0.01 | 3.47 | 1.1E+09 | 85 | 3 | 341 |
| example 10 | AlN/Sm2O3/ Al2O3/Yb2O3/ TiO2 = 100/5/6.4/2.4/1 | 1800 | 3.3 | 1.64 | 0.54 | 4.04 | SmAl11O18 | 0.02 | 3.44 | 6.6E+09 | 81 | 3 | 360 |
| comparative example 3 | AlN/TiN = 73/27 | 1800 | — | — | — | — | TiN | 0.00 | 3.667 | <100 | 63 | — | — |

TABLE 4

| | XRD | | | | | | | |
|---|---|---|---|---|---|---|---|---|
| | Conductive phase | | AlN | | Conductive phase/AlN (%) | | | |
| | | | | | SmAl11O18 | SmAl11O18 | | |
| | SmAl11O18 ($2\theta = 18.8°$) | SmAl11O18 (strongest peak) | AlN (101) | AlN (100) | ($2\theta = 18.8°$)/ AlN (101) | (strongest peak)/ AlN (100) | Current Response | a |
| Example 6 | 112 | 415 | 7009 | 8762 | 1.6 | 4.7 | 1.00 | 1.48 |
| Example 7 | 55 | 202 | 3817 | 4772 | 1.4 | 4.2 | 1.00 | 1.47 |
| Example 8 | 86 | 319 | 6797 | 8496 | 1.3 | 3.8 | 1.03 | 1.45 |
| Example 9 | 162 | 599 | 5931 | 7414 | 2.7 | 8.1 | 1.00 | 1.40 |
| Example 10 | 229 | 849 | 6385 | 7982 | 3.6 | 10.6 | 1.01 | 1.48 |
| Comparative Example 3 | 4120 | | 4514 | | 91.3 | | — | — |

In Comparative Example 1, yttria is added to AlN powder so that the resistivity of the AlN grains are reduced and made to be conductive. The relationship between the current value and time after the application of voltage is shown in FIG. 1. As can be seen from FIG. 1, the current value is increased over a long time after the application of voltage. The current response index is thus low.

Figure 4:
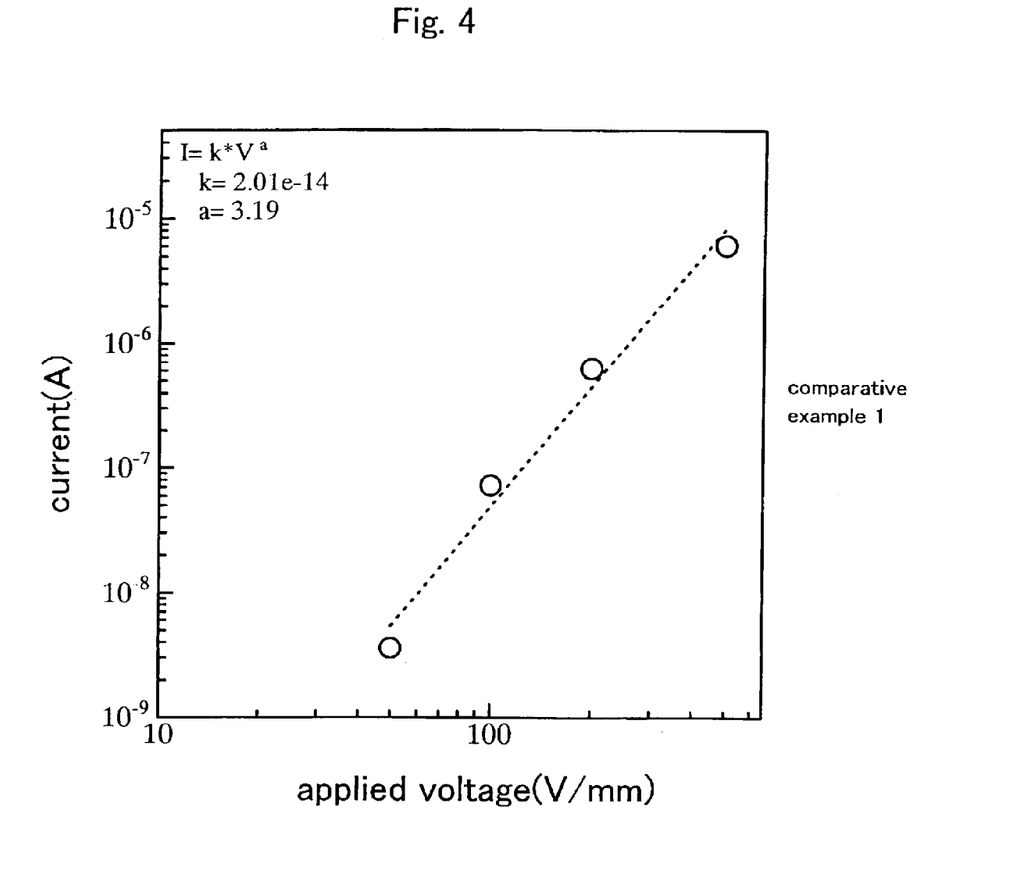
FIG. 4 shows the dependency of the current value on the applied voltage and the results of fitting based on the minimum square method in Comparative Example 1.

Further, in the sample of Comparative Example 1, the voltage-current property was plotted in FIG. 4. The vertical axis of the graph represents a current value expressed in logarithmic scale. The horizontal axis of the graph represents applied voltage expressed in logarithmic scale. The plots were fitted to the above function based on minimum square method to calculated the slope "a". As a result, "a" was as large as 3.19, that is the voltage-current property was considerably non-linear.

Figure 2:
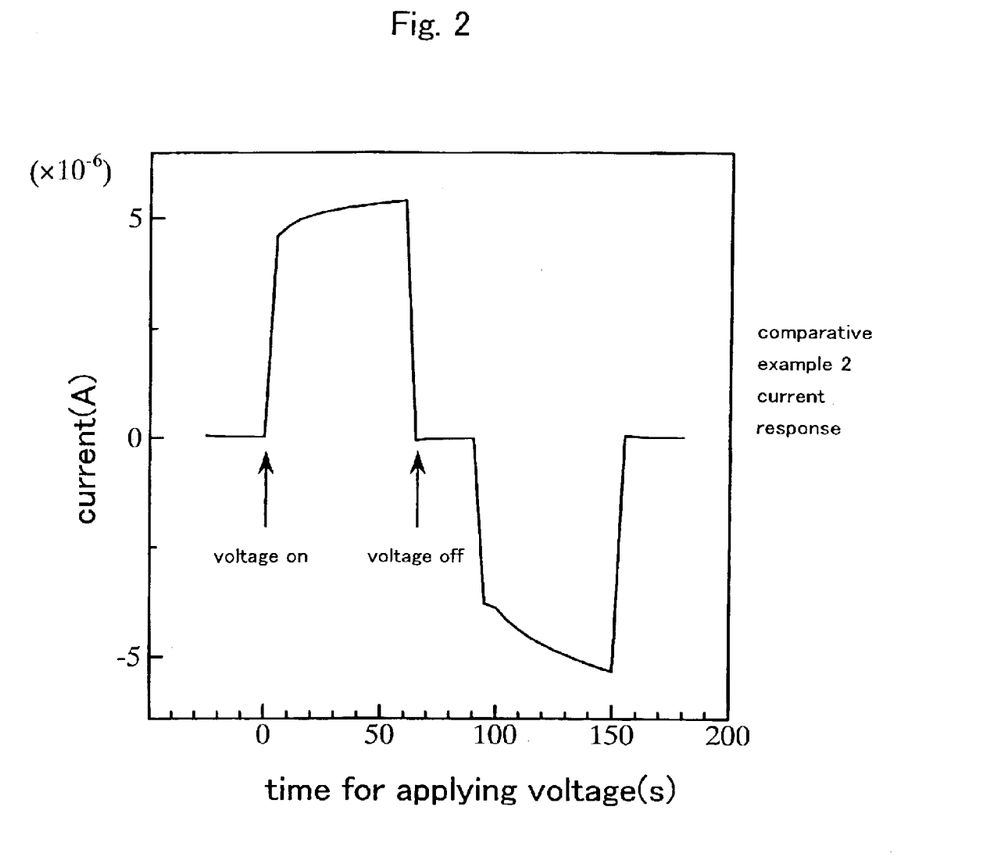
FIG. 2 is a graph showing the current response of a sample according to Comparative Example 2.

In Comparative Example 2, ceria is added to AlN powder so that the resistivity of the AlN grains are reduced and made to be conductive. The relationship between the current value and time after the application of voltage is shown in FIG. 2. As can be seen from FIG. 2, the current value is increased over a long time after the application of voltage. The current response index is thus low.

In Comparative Example 3, a large amount of titanium nitride is added to AlN powder so that an intergranular phase mainly consisting of titanium nitride is made to be continuous and interconnected and thus made to be conductive. The content of the conductive phase is 27 weight percent. The integrated strength of the conductive phase is as large as 91.3 percent based on X-ray diffraction analysis. The thermal conductivity is considerably reduced. That is, the characteristic property of aluminum nitride material is lost. When the added amount of titanium nitride is reduced, the intergranular phase is not interconnected and thus does not function as a conductive phase.

Examples 1 and 2 provide materials of low volume resistivities each having a conductive intergranular phase (a $SmAl_{11}O_{18}$ phase). In addition to the low volume resistivity, the current response index proved to be 1.00.

A current distribution analytic image was taken for each of the samples according to Examples 1 and 2 using AFM as described above. The DC bias was set at +18 V and the observed area was 100 $\mu$m×100 $\mu$m. As a result, an interconnected and network-like phase having a low volume resistivity was present. That is, the intergranular phase proved to be continuous and interconnected to function as conductive path.

Examples 3 to 10 provide materials of low volume resistivities each having a conductive intergranular phase (a $SmAl_{11}O_{18}$ phase). Further, in Examples 3 to 10, ytterbium was added. As a result, in addition to the low volume resistivity, the current response index, non-linear index "a" and thermal conductivity were also excellent.

Figure 3:
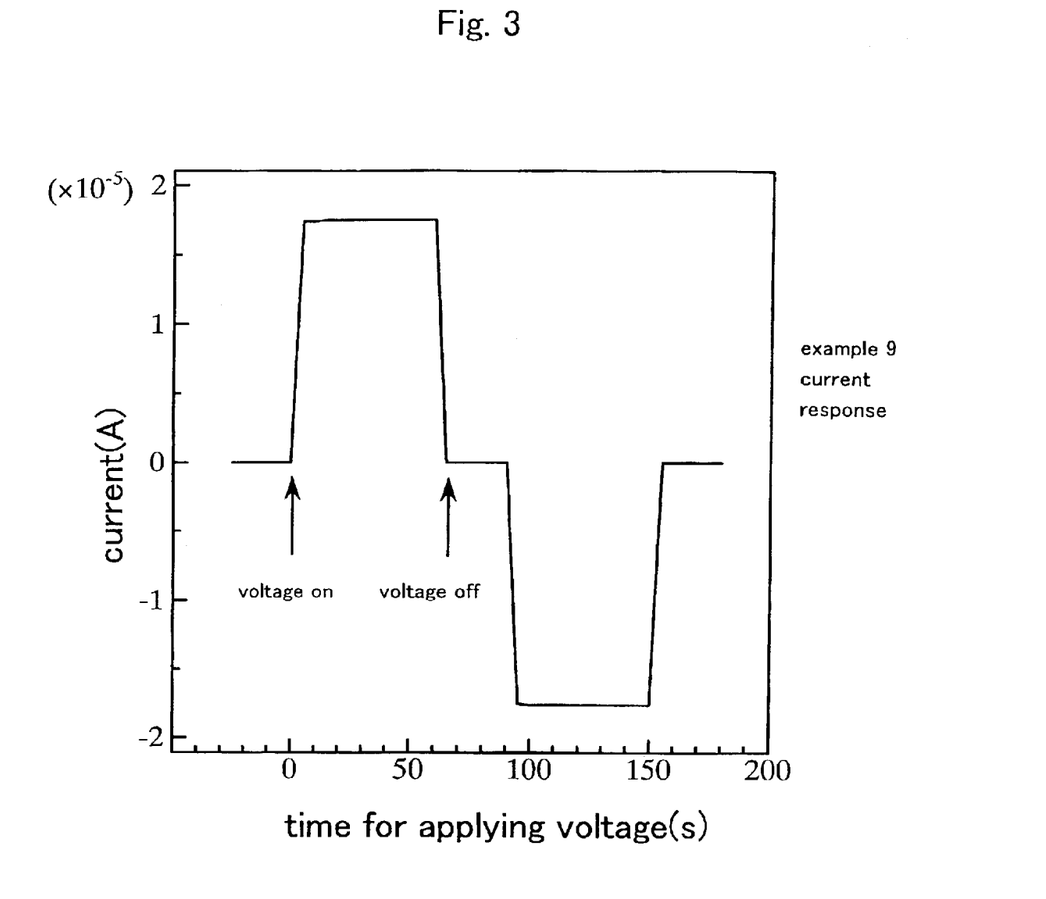
FIG. 3 is a graph showing the current response of a sample according to Example 9.

FIG. 3 shows the current response of the sample according to Example 9 as a representative example. A constant current value was obtained directly after the application of voltage. Moreover, the current value was not changed over a long period of time.

Figure 5:
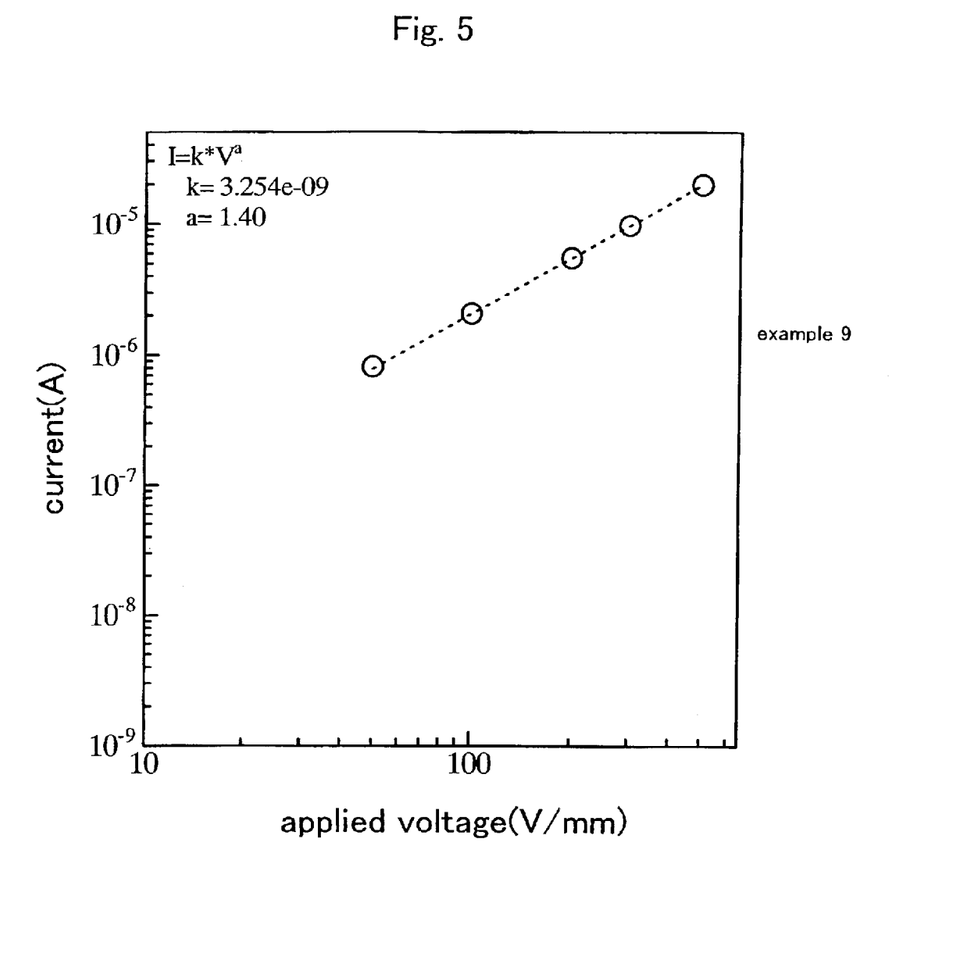
FIG. 5 shows the dependency of the current value on the applied voltage and the results of fitting based on the minimum square method in Example 9.

FIG. 5 shows voltage-current property of the sample according to Example 9 as a representative example. As shown in FIG. 5, the change of the current value after the application of voltage was proved to be smooth compared with that shown in FIG. 4. That is, the sample according to Example 9 is more ohmic.

Further, in Examples 3 to 10, current distribution analytic images were obtained by means of AFM as described above. The DC bias was set at +18 V, and the observed area was 100 $\mu$m×100 $\mu$m. As a result, an interconnected and network-like phase having a low volume resistivity was present. That is, the intergranular phase proved to be continuous and interconnected to function as conductive path.

Further, backscattering distribution images were taken and element distribution was analyzed by means of EPMA for the samples according to Examples 3 to 10. Examples 1 and 7 will be explained as representative.

Figure 6:
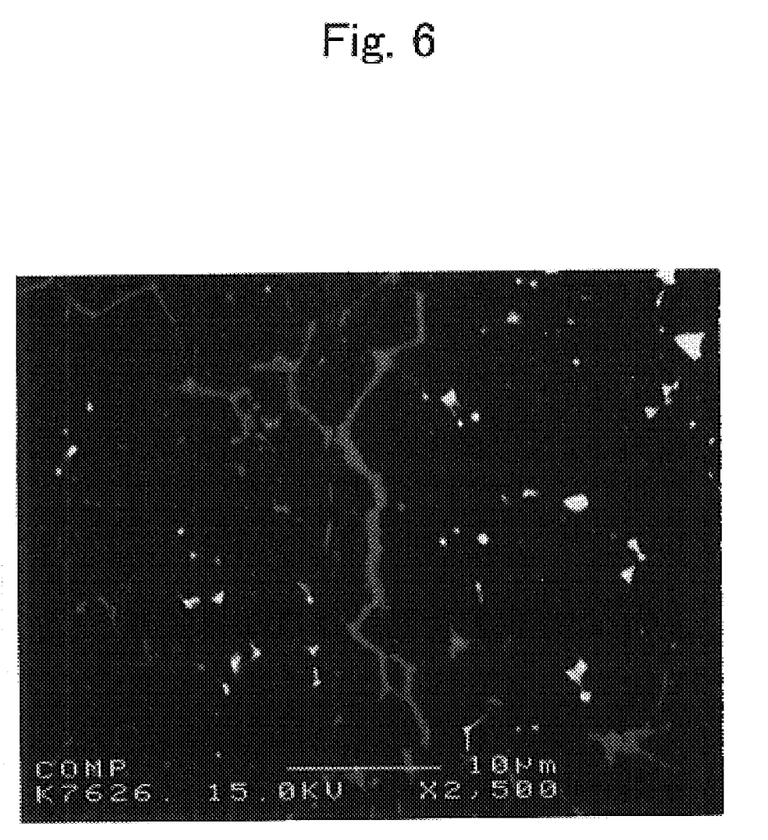
FIG. 6 is a photograph showing a backscattering electron image of the sample of Example 1.

FIG. 6 shows a backscattering electron image of the sample according to Example 1. This image includes brighter regions including gray regions distributed in network-like manner and isolated white regions. Further, the intergranular phase proved to be composed of a $SmAlO_3$ phase, a $SmAl_{11}O_{18}$ phase and a TiN phase, based on the results of X-ray diffraction analysis.

Figure 7:
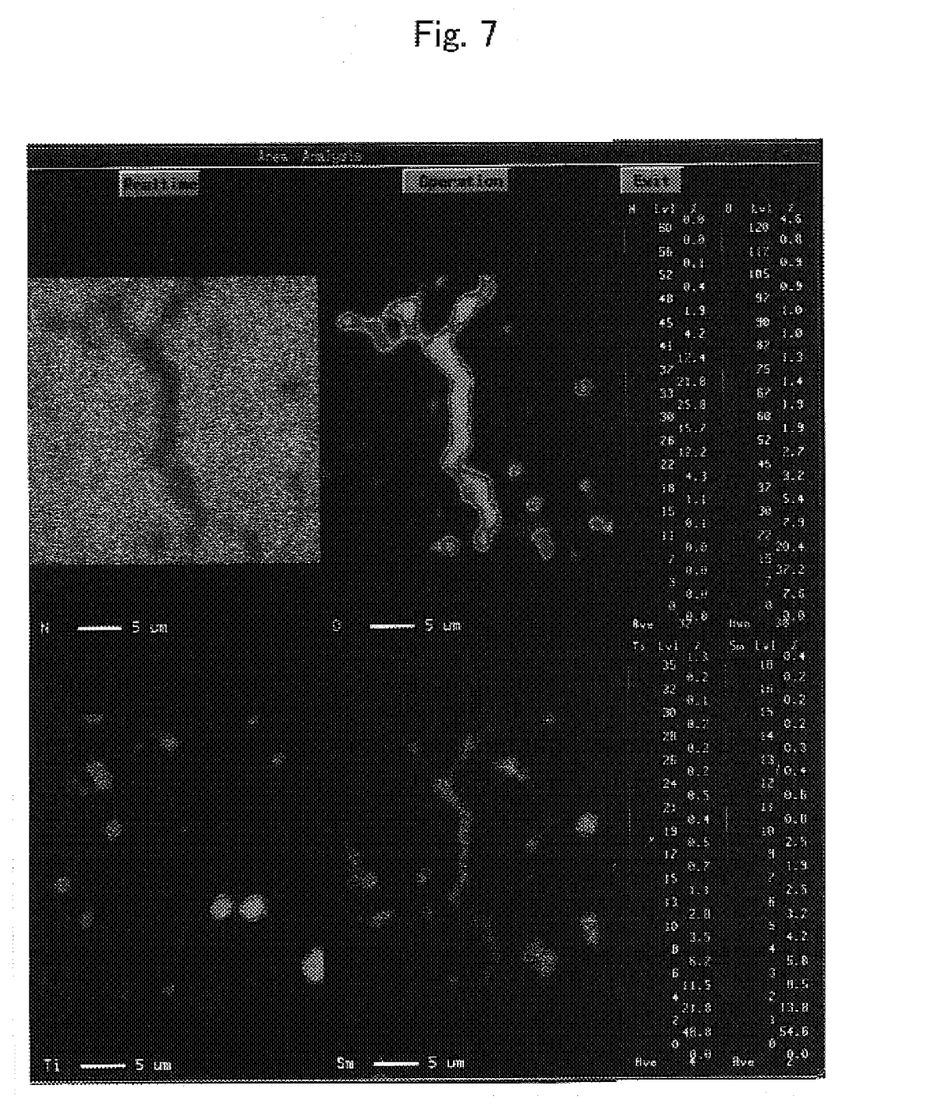
FIG. 7 is a photograph showing the results of the EMPA analysis of the elements over the same visual field as FIG. 6.

FIG. 7 shows the distribution of each element over the same visual field as FIG. 6 by EPMA. Considering the backscattering electron image of FIG. 6 and the EPMA results shown in FIG. 7, the concentration of Sm atoms is highest in the isolated white regions. The white regions are thus considered to be a $SmAlO_3$ phase. The gray regions distributed in network-like manner had a lower Sm content and is thus considered to be a $SmAl_{11}O_{18}$ phase. The Ti-containing phase is observed as an isolated phase. It was further shown that the $SmAl_{11}O_{18}$ phase constitutes an intergranular phase interconnected to provide a conductive path, based on the results of analysis of current distribution analytic image taken by AFM (atomic force microscope).

Figure 8:
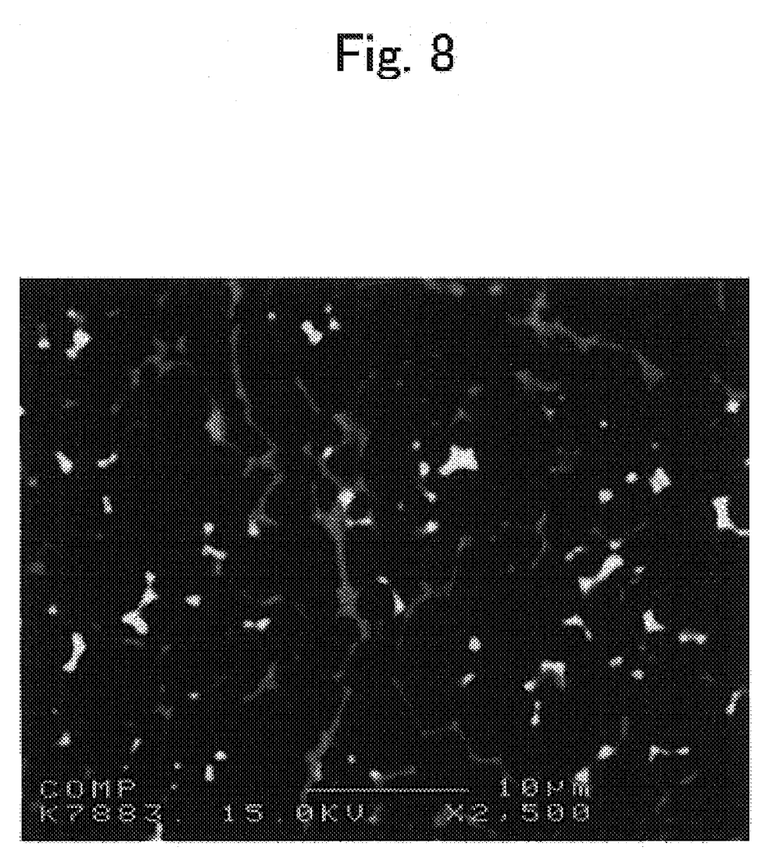
FIG. 8 is a photograph showing a backscattering electron image of the sample of Example 7.
Figure 9:
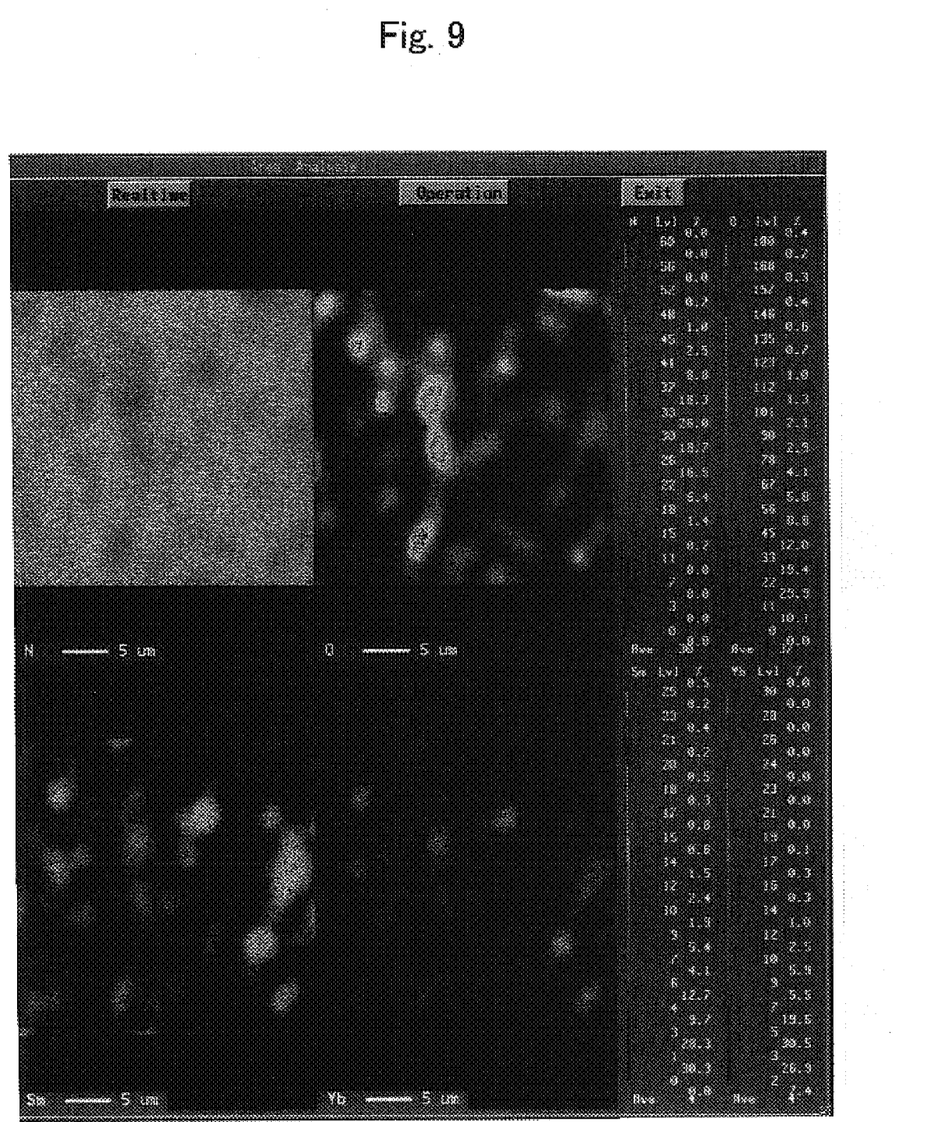
FIG. 9 is a photograph showing the results of the EMPA analysis of elements over the same visual field as FIG. 8.

FIG. 8 is a backscattering electron image of the sample according to Example 7. FIG. 9 shows the distribution of elements in the sintered body over the same visual field as FIG. 8 taken by EPMA. The same intergranular phase as Example 1 was observed. Yb is present in the interconnected phase corresponding with the $SmAl_{11}O_{18}$ phase and is also present as an isolated phase. It is thus considered that part of the Yb atoms are present in the conductive $SmAl_{11}O_{18}$ phase to provide the ohmic property of the material (the change of current value for the change of the applied voltage is small). Further, substantially the same results were obtained in Examples 3, 4, 5, 6, 8, 9 and 10.

As described above, the present invention provides an aluminum nitride material having a high thermal conductivity and reduced volume resistivity at room temperature. The present invention further provides an aluminum nitride material having an improved response (stability) for an applied voltage.

The present invention has been explained referring to the preferred embodiments. The invention is, however, not limited to the illustrated embodiments which are given by way of examples only, and may be carried out in various modes without departing from the scope of the invention.

What is claimed is:

1. An aluminum nitride material comprising an interconnected intergranular phase functioning as an electrically conductive phase and containing ytterbium, wherein a content of said conductive phase is not higher than 20 percent calculated according to the following formula based on an X-ray diffraction profile:

Content of said conductive phase (%)=(Integrated strength of a strongest peak of said conductive phase/Integrated strength of a strongest peak of aluminum nitride phase)×100.

2. The aluminum nitride material of claim 1, wherein said material has an electric current response index in a range of 0.9 to 1.1 defined according to the following formula when a voltage is applied:

Electric current response index=(Electric current at 5 seconds after said voltage is applied/Electric current at 60 seconds after said voltage is applied).

3. The aluminum nitride material of claim 1, wherein said aluminum nitride material has a non-linear index "a" that is not higher than 1.5 over an applied voltage "V" range of 50 V/mm to 500 V/mm when $I=kV^a$, wherein "I" represents a current value and "k" represents a constant.

4. The aluminum nitride material of claim 1, wherein a room temperature volume resistivity of said aluminum nitride material is not larger than $10^{12}$ Ω·cm at an applied voltage of 500 V/mm.

5. The aluminum nitride material of claim 1, wherein said conductive phase has a network microstructure.

6. The aluminum nitride material of claim 1, wherein said conductive phase is mainly $SmAl_{11}O_{18}$.

7. The aluminum nitride material of claim 6, wherein said content of said conductive phase is not higher than 10 percent calculated according to the following formula based on said X-ray diffraction profile:

Content of said conductive phase (%)=[(I ($SmAl_{11}O_{18}$, 2θ=18.8°)/ I(AlN, (101))]×100;

wherein I ($SmAl_{11}O_{18}$, 2θ=18.8°) represents an integrated strength of a peak having 2θ of 18.8° and I(AlN, (101)) represents an integrated strength of an aluminum nitride (101) plane.

8. The aluminum nitride material of claim 1, further comprising samarium, wherein a weight ratio of a ytterbium content to a samarium content (Yb/Sm) is in a range of 0.01 to 1.

9. A member for producing semiconductors comprising said aluminum nitride material of claim 1.

10. An aluminum nitride material comprising an interconnected intergranular phase functioning as an electrically conductive phase and containing ytterbium, said aluminum nitride material having an electric current response index in a range of 0.9 to 1.1 defined according to the following formula, when a voltage is applied:

Electric current response index=(Electric current at 5 seconds after said voltage is applied/Electric current at 60 seconds after said voltage is applied).

11. The aluminum nitride material of claim 10, wherein a non-linear index "a" of said aluminum nitride material is not higher than 1.5 over an applied voltage "V" range of 50 V/mm to 500 V/mm when $I=kV^a$, wherein "I" represents a current value and "k" represents a constant.

12. The aluminum nitride material of claim 10, wherein a room temperature volume resistivity of said aluminum nitride material is not larger than $10^{12}$ Ω·cm at an applied voltage of 500 V/mm.

13. The aluminum nitride material of claim 10, wherein said conductive phase has a network microstructure.

14. The aluminum nitride material of claim 10, wherein said conductive phase is mainly $SmAl_{11}O_{18}$.

15. The aluminum nitride material of claim 14, wherein said content of said conductive phase is not higher than 10 percent calculated according to the following formula based on an X-ray diffraction profile:

Content of said conductive phase (%)=[(I ($SmAl_{11}O_{18}$, 2θ=18.8°)/ I(AlN, (101))]×100;

wherein I ($SmAl_{11}O_{18}$, 2θ=18.8°) represents an integrated strength of a peak having 2θ of 18.8° and I(AlN, (101)) represents an integrated strength of an aluminum nitride (101) plane.

16. The aluminum nitride material of claim 10, further comprising samarium, wherein a weight ratio of a ytterbium content to a samarium content (Yb/Sm) is in a range of 0.01 to 1.

17. A member for producing semiconductors comprising said aluminum nitride material of claim 10.

18. An aluminum nitride material comprising an interconnected intergranular phase functioning as an electrically conductive phase and containing ytterbium, said aluminum nitride material having a non-linear index "a" that is not higher than 1.5 over an applied voltage "V" range of 50 V/mm to 500 V/mm, when $I=kV^a$, wherein "I" represents a current value and "k" represents a constant.

19. The aluminum nitride material of claim 18, wherein a room temperature volume resistivity of said aluminum nitride material is not larger than $10^{12}$ Ω·cm at an applied voltage of 500 V/mm.

20. The aluminum nitride material of claim 18, wherein said conductive phase has a network microstructure.

21. The aluminum nitride material of claim 18, wherein said conductive phase is mainly $SmAl_{11}O_{18}$.

22. The aluminum nitride material of claim 21, wherein a content of said conductive phase is not higher than 10 percent calculated according to the following formula based on an X-ray diffraction profile:

Content of said conductive phase (%)=[(I ($SmAl_{11}O_{18}$, 2θ=18.8°)/ I(AlN, (101))]×100;

wherein I ($SmAl_{11}O_{18}$, 2θ=18.8°) represents an integrated strength of a peak having 2θ of 18.8° and I(AlN, (101)) represents an integrated strength of an aluminum nitride (101) plane.

23. The aluminum nitride material of claim 18, further comprising samarium, wherein a weight ratio of a ytterbium content to a samarium content (Yb/Sm) is in a range of 0.01 to 1.

24. A member for producing semiconductors comprising said aluminum nitride material of claim 18.

* * * * *